United States Patent Office 3,338,679
Patented Aug. 29, 1967

3,338,679
METHOD FOR PRODUCING BORON CARBIDE
Akinori Muta and Tetsuo Gejo, Suginami-ku, Tokyo-to, and Masao Shiozawa, Hitachi-shi, Japan, assignors to Kabushiki Kaisha Hitachi Seisakusho, Tokyo-to, Japan, a joint-stock company of Japan
No Drawing. Filed Dec. 31, 1963, Ser. No. 334,909
Claims priority, application Japan, Jan. 9, 1963, 38/157
4 Claims. (Cl. 23—208)

This invention relates to techniques in the production of boron carbide, and more particularly it relates to a new and original method for producing boron carbide.

Since boron carbide is second only to diamond in hardness, it has been used widely for many years as an abrasive. However, since it also possesses various other excellent properties such as physical and chemical stability, low vapor pressure, and large cross sections for absorption of thermal neutrons, it has attracted much attention and has been studied in recent years as an industrial material for the atomic power industries and chemical industries.

Among the commonly known industrial methods for producing boron carbide, there are:

(1) The method of causing boron compounds to react with carbon.
(2) The method of causing metallic boron to react with carbon.

In the first of the above methods, it is necessary to carry out the reaction at a super-high temperature of 2,400° C. or higher. In the second of the above methods, it is necessary to use high-priced metallic boron.

It is an object of the present invention to overcome the above-stated difficulties and to provide a method for producing boron carbide readily, at low cost, at low temperature, and with high yield.

In the course of the present inventors' research relating to the production of boron carbide at low cost and at low temperatures with compounds of boron as starting material, the following analytical considerations were made.

In the case of production of boron carbide from anhydrous boric acid and carbon, the following chemical equation is applicable.

$$2B_2O_3 + 7C = B_4C + 6CO$$

The standard free energy of formation $\Delta G°$ is given by the following formula:

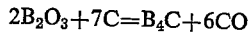
$$\Delta G° = 52,600 - 260T$$

where T is the absolute temperature. The theoretical reaction-starting temperature of this reaction is 2,030° K.

When metallic magnesium is added to the above-mentioned reactants, a reaction represented by the following formula occurs:

$$2B_2O_3 + 6Mg + C = B_4C + 6MgO$$

The standard free energy of formation $\Delta G°$ of this reaction is as follows:

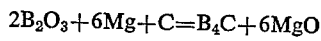
$$\Delta G° = -12,400 - 3.6T$$

The corresponding theoretical reaction-starting temperature of this reaction is substantially lower than that of the aforementioned reaction without magnesium. That is, by the equilibrium theory, there is the possibility of the above reaction occurring at the room temperature, and it is known that the above reaction takes place at a temperature of 1,200° C. or higher. However, for the aforementioned reasons, if it is possible to obtain a high reaction rate for the reaction of magnesium addition by selecting a suitable catalyst, it should be possible to produce boron carbide also at a lower temperature.

In view of the above considerations, the present inventors studied methods for production of boron carbide at lower temperatures through the use of various catalysts. The present invention is based on the results of this study and, in its general aspect, resides in a method of producing boron carbide which comprises adding a sulfate to a mixture of a boron compound, carbon, and magnesium, or further adding to these substances a reaction inhibitor which does not reach with any of these substances, and heating the resulting mixture to a temperature of from approximately 650 to 1,100° C.

The specific nature and details will be more clearly apparent by reference to the following detailed description, including typical examples of procedure according to the method of the invention.

The method of the invention may be practiced, in general, as follows, by first mixing a boron compound such as anhydrous boric acid or sodium borate, magnesium powder, and carbon. To the resulting mixture, a sulfate such as potassium sulfate, sodium sulfate, aluminum sulfate, magnesium sulfate, copper sulfate, nickel sulfate or calcium sulfate is added, and the mixture is further mixed. The mixture proportions are preferably such that the boron compound, magnesium powder, and carbon are substantially in their theoretical proportions for mutual reaction, and the proportion of the sulfate is in the range of approximately from 0.1 to 50 percent by weight relative to the total quantity of the said three reactants.

The mixture so produced is placed in a vessel such as a graphite boat, which is then placed in a reaction chamber such as a reaction tube, and the mixture is heated at a temperature of approximately from 650 to 1,100° C. in a stream of argon, nitrogen, or hydrogen. Then the resulting material is cooled, taken out of the vessel, treated with a heated acid, and washed with water, and the separated residue is then dried to obtain boron carbide.

An alternative procedure is to add further to the above-stated starting materials a reaction inhibitor such as, for example, magnesium oxide which does not react with the said materials, and then to carry out the above-described steps of heating, cooling, treating with acid, washing with water, and drying. This procedure produces good results, particularly a high yield.

In order to indicate still more fully the nature of the present invention, the following examples of typical procedure are set forth, but these examples are presented as illustrative only, and they are not intended to limit the scope of the invention.

*Example 1*

Appropriate quantities of anhydrous boric acid, magnesium powder, active carbon, and potassium sulfate were separately prepared to grain sizes from 100 to 150 mesh (meshes per inch) and then dried at 110° C. for approximately one hour. Next, 139 grams of the anhydrous boric acid, 146 grams of the magnesium powder, 12 grams of the active carbon, and 30 grams of the potassium sulfate were mixed and placed in a graphite boat, which was then placed in a refractory reaction vessel and then heated at a temperature of 700° C. for one hour in a stream of argon gas flowing at a flowrate of 1,000 cc. per minute. Then the batch in the boat was cooled to room temperature, and the boat was taken out of the reaction vessel. The reaction products were then thoroughly treated for several hours with 60 percent sulfuric acid at 100° C. to dissolve out potassium sulfate, slag, free boron, and unreacted anhydrous boric acid. The resulting batch was filtered, and the retained residue was washed with water. The residue so obtained was dried at 110° C. The product boron carbide was found to weigh 37.5 grams, so that a yield of 67.9 percent was obtained. Analysis of this boron carbide indicated a boron content of 74.6 percent and a carbon content of 25.2 percent.

The above procedure was repeated with the potassium sulfate replaced by each of sodium sulfate, nickel sulfate, and copper sulfate, the reaction temperature in each case being 700° C., and by each of magnesium sulfate and calcium sulfate, the reaction temperature in each of the last two cases being 830° C. As a result, it was possible in each case to form boron carbide with substantially the same yield as that in the above-described example wherein potassium sulfate was used.

For comparison, the above procedure was repeated without the addition of a sulfate as a catalyst to the reaction system, whereupon it was found that boron carbide was not formed even at a reaction temperature of 1,100° C.

*Example 2*

Appropriate quantities of anhydrous boric acid, magnesium powder, active carbon, potassium sulfate, and magnesium oxide were separately prepared to grain sizes from 100 to 150 mesh and then dried at 110° C. for approximately one hour. Next, 139 grams of the anhydrous boric acid, 146 grams of the magnesium powder, 12 grams of the active carbon, 30 grams of the potassium sulfate, and 29.7 grams of the magnesium oxide were mixed and then heated at a temperature of 700° C. for one hour in a stream of argon gas flowing at a flowrate of 1,000 cc. per minute. The batch of reaction product was then cooled and subjected to thorough treatment for several hours with 60 percent sulfuric acid at 100° C. to dissolve out potassium sulfate, slag, free boron, and unrelated anhydrous boric acid. The batch was then filtered, and the retained residue was washed with water. The resulting residue was dried at 110° C. The weight of the boron carbide so produced was found to be 52.6 grams, thus a yield of 94.9 percent was obtained. Analysis of the product indicated a boron content of 76.0 percent and a carbon content of 23.8 percent.

As will be apparent from a comparison between the foregoing Examples 1 and 2, by the use of, for example, magnesium oxide as a reaction inhibitor added beforehand to the reactants, it is possible to raise the resulting yield by approximately 27.0 percent. It is to be observed that since the added magnesium oxide is readily dissolved out by the heated sulfuric acid, it has no effect whatsoever on the purity of the product.

As described above, the present invention affords a method whereby, by the addition of a sulfate, boron carbide can be produced at extremely low cost, without the use of high-priced metallic boron, and with a reaction temperature which is substantially lower than that necessary for conventional methods.

Moreover, the method of the invention as practiced with the addition of magnesium oxide produces boron carbide with a surprisingly high yield.

Since it is obvious that many changes and modifications can be made in the above described details without departing from the nature and spirit of the invention, it is to be understood that the invention is not to be limited to the details described herein except as set forth in the appended claims.

What is claimed is:
1. A process for the production of boron carbide which comprises adding to $B_2O_3$, carbon and magnesium, substantially in their theoretical proportions, a catalyst selected from the group consisting of potassium sulfate, sodium sulfate, aluminum sulfate, magnesium sulfate, copper sulfate, nickel sulfate, or calcium sulfate, heating the resultant mixture at a temperature of substantially 650–830° C., and recovering the boron carbide thus formed from the reaction product.
2. The process as defined in claim 1, wherein said catalyst is present substantially in 0.1 to 50 weight percent relative to the combined other reactants.
3. The process as defined in claim 1, wherein magnesium oxide is incorporated in the reaction mixture as a reaction inhibitor.
4. The process as defined in claim 3, wherein said magnesium oxide is present substantially in 10 weight percent of the total reactants.

References Cited

UNITED STATES PATENTS 2,834,651   5/1958   Gray _____ 23—208

FOREIGN PATENTS 740,547   11/1955   Great Britain.
898,403   6/1962   Great Britain.

OSCAR R. VERTIZ, *Primary Examiner.*

G. T. OZAKI, *Assistant Examiner.*